United States Patent

Orthmann

[11] Patent Number: 5,864,218
[45] Date of Patent: Jan. 26, 1999

[54] METHOD FOR CONTROLLING THE SWITCHING-OFF PROCESS IN THE PHASE WINDINGS OF A RELUCTANCE MOTOR

[75] Inventor: Reinhard Orthmann, Mainz, Germany

[73] Assignee: Daimler-Benz AG, Stuttgart, Germany

[21] Appl. No.: 750,536

[22] PCT Filed: Jun. 13, 1994

[86] PCT No.: PCT/EP94/01916

§ 371 Date: May 16, 1997

§ 102(e) Date: May 16, 1997

[87] PCT Pub. No.: WO95/34947

PCT Pub. Date: Dec. 21, 1995

[51] Int. Cl.$^6$ ........................................................ H02P 7/00
[52] U.S. Cl. ........................................... 318/701; 318/254
[58] Field of Search .................................. 318/701, 254, 318/439, 138

[56] References Cited

U.S. PATENT DOCUMENTS

| 4,739,240 | 4/1988 | MacMinn et al. . |
| 5,043,643 | 8/1991 | Hedlund et al. ........................ 318/254 |
| 5,168,203 | 12/1992 | Tepavcevic ............................. 318/701 |
| 5,783,916 | 7/1998 | Blackburn .............................. 318/254 |

FOREIGN PATENT DOCUMENTS

| 0599334 | 6/1994 | European Pat. Off. . |
| 2697697 | 5/1994 | France . |
| 2813784 | 12/1989 | Germany . |

OTHER PUBLICATIONS

Bimal K. Bose et al.: "Microcomputer Control of Switched Reluctance Motor". In: IEEE Transactions of Industry Applications, vol. 1A–22, No. 4, Jul./Aug. 1986, pp. 708–715.

P.J. Lawrenson et al.: "Variable–speed switched reluctance motors". In: IEE Proc., vol. 127, Pt. B, No. 4, Jul. 1980, pp. 253–264.

J.W. Finch et al .: "Control aspects of brushless drives using switched reluctance motors". In: Proc. IEE, Conf. PEVD'90, London, pp.237–242.

J.T. Bass et al.: "Simplified Electronics for Torque Control of Sensorless Switched–Relectance Motor". In: IEEE Transactions on Industrial Electronics, vol. IE–34, No. 2, May 1987, pp. 234–239.

*Primary Examiner*—Jonathan Wysocki
*Attorney, Agent, or Firm*—Venable; George H. Spencer; Norman N. Kunitz

[57] ABSTRACT

A process is disclosed for controlling the switching-off process of the branches of a reluctance engine whose stator is provided with windings to which are transmitted current pulses calculated as a function of angular position and speed of rotation of the rotor according to a predetermined algorithm. The excited branch is switched off when a switching-off angle is reached after a zero crossing reference angle. Two ranges of operation called "chop" range and blocked voltage range must be differentiated. The switching-off angle for both ranges of operation of the reluctance engine is calculated according to the same algorithm and is set by a regulator. In the lower speed of rotation range, the "chop" range, a pulse width modulated voltage is applied to the conductive branch, and in the upper range, the blocked voltage range, a constant voltage is applied. In both ranges, the switching-off angle is calculated from engine parameters and actual operation values to maximize torque yield and to trigger the switching-off process by converting said values into a switching-off pulse that switches off the conductive branch.

5 Claims, 5 Drawing Sheets

METHOD FOR CONTROLLING THE SWITCHING-OFF PROCESS IN THE PHASE WINDINGS OF A RELUCTANCE MOTOR

FIELD OF THE INVENTION

The invention relates to a method for controlling a reluctance motor.

BACKGROUND OF THE INVENTION

In the special embodiment with six stator teeth and four rotor teeth, the switched reluctance motor represents the most economical option for implementing a brushless drive. It was possible to reduce the drawback, which the motor had up until now, namely a high reactive power pulsation, to a small measure through special designs of the magnetic circuits of this motor. Novel circuit topologies became possible in the actuation electronics of this motor through the use of power circuit breakers.

These reasons and its extraordinary robustness predestine this drive principle for use in mass-manufactured products, in particular, in motor vehicles.

The physical principle of torque extraction of this motor type is based on the desire of a magnetic circuit permeated by a magnetic flux to minimize the magnetic resistance (or: reluctance) which is active in the circuit. If a rotor with a rotational angle-dependent magnetic resistance is disposed in a magnetic circuit, a rotational force is exerted upon the rotor if its rotation results in a reduction of the magnetic resistance.

FIG. 1 illustrates an exemplary course of the phase winding inductances of a three-phase reluctance motor having three phase windings, which motor has four rotor teeth and six stator teeth according to FIG. 2.

From IEE PROC., vo. 127B, no. 4, July, 1980, p. 25253–265: P. J. LAWRENSON ET AL. "Variable-speed switched reluctance motors", a calculation method for the behavior of a reluctance motor at a variable speed is known. Characteristic curves for the magnetic flux densities, currents and torques as a function of the rotational angle and of the angular velocity are indicated. A realization for circuit engineering is not indicated.

A microcomputer is used to retrieve the data regarding the switch-on course of the stator phases, which data are stored in a memory, and to therefrom match the switch-on angle and the pulse width of the current pulses switched in phases to the operating behaviors of the motor within certain limits. This matching of the pulse position and of the pulse duration makes it possible to obtain a large torque and speed range. At higher speeds, however, optimum matching can no longer take place in this simple manner. Therefore, towards higher speeds, the torque is reduced very quickly and the motor losses increase.

It is the object of the invention to set the switch-off angle for all operating states of the motor for a reluctance motor of the type described at the outset in such a way that a maximum output or torque yield is accomplished at a high efficiency and torque waviness as well as noise development are reduced.

This object is accomplished by a method for controlling a reluctance motor whose stator is provided with windings upon which, as a function of the angular position and the speed of rotation of the rotor, current pulses calculated according to a predetermined algorithm are impressed. Each winding phase excited according to a predetermined switch-on angle is switched off according to a switch-off angle ($\gamma_p$) whose angular count starts with the inductance rise of the excited phase winding. Two operating ranges must be differentiated, which are identified as a "chop" range and a block voltage range.

For the method, the switch-off angle ($\gamma_p$) for all operating ranges of the reluctance motor is calculated, from the actual value of the speed of rotation ($n_{ist}$), the actual value of the supply voltage ($u_k$), the minimum and maximum inductances ($L_{min}$, $L_{max}$) of a motor phase winding, and the value of the stator pole angle ($\beta_s$). The minimum and maximum inductances ($L_{min}$, $L_{max}$) of a motor phase winding and the value of the stator pole angle ($\beta_s$) are stored in a memory. The limit current ($i_G$) is first determined from the product of the actual value of the supply voltage ($u_k$) and the value of the stator pole angle ($\beta_s$) divided by the product executed in a multiplier of the actual value of the speed of rotation ($n_{ist}$) and the difference between the maximum and minimum ($L_{max}$, $L_{min}$) inductances of a motor phase winding.

Further, for the invention, the limit current is then supplied to a divider (B5), which determines a normalized current ($I_o$) from the desired value of the current ($i_{soll}$) and the limit current ($i_G$). The normalized current ($I_o$) is supplied to a nonlinear functional network (B7), which determines the switching-off time ($t_{off}$) with the fixedly deposited values for the stator pole angle ($\beta_s$), the values for the relative pole overlap of stator teeth and rotor teeth ($\alpha_c$), the rotor angle ($\beta_R$), and the minimum and maximum inductances ($L_{min}$, $L_{max}$). The switching-off time ($t_{off}$) is evaluated in a subsequent functional network (B8) with the speed of rotation information (R/L). The output of the subsequent functional network (B8) is supplied to a nonlinear time element (B9) and is used for the triggering of the switching-off process at the stator windings.

With the method of the invention, the angular position of the rotor relative to the stator is measured by means of an angle sensor and therewith an initialization pulse is triggered and supplied to a controller which, by means of an arithmetical unit, first determines the switch-off angle ($\alpha_p$) at which the switching-off process begins from the angular position of the stator, represented by the stator pole angle $\beta_s$, and then the angle ($\alpha_g$) at which the switching-off process must be completed, i. e., which determines the moment for the switching-off process of the current-conducting phase winding.

Additionally, for the method, the speed of rotation is controlled via the current intensity in the stator windings.

Moreover, the switching-off process is triggered when approximately ⅔ of the total time has passed after the symmetrical overlap of stator teeth and rotor teeth.

Further, with the invention, after the measurement of the actual speed of rotation ($n_{ist}$), the determination of the desired value of the current ($i_{soll}$) is determined and subsequently the speed of rotation (n) is controlled to the desired value by means of the phase winding current ($i_s$) calculated from the desired value of the current ($i_{soll}$).

Details of the invention are explained below in greater detail with reference to the drawing.

DETAILED DESCRIPTION OF THE PREFERRED EMBODIMENTS

If the magnetic circuit for generating the magnetic flux has an electric winding, the magnetic resistance active in the circuit determines the inductance of this winding.

Figure 1:
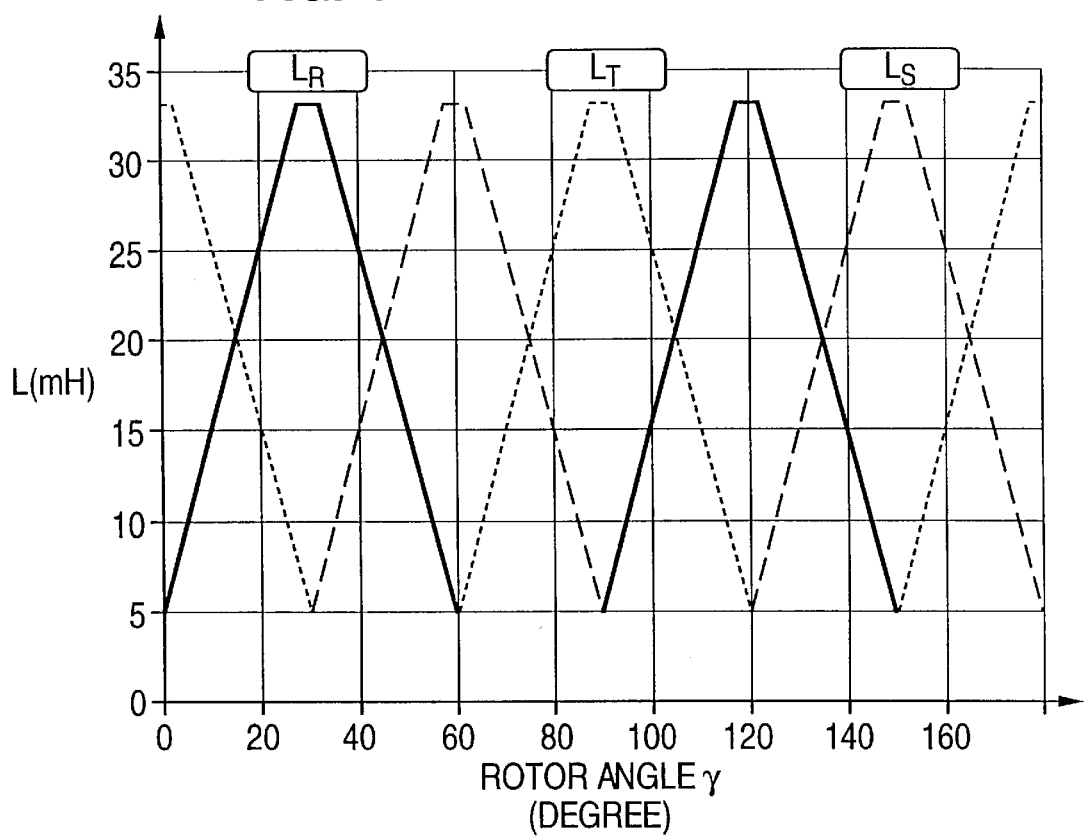
FIG. 1 the phase winding inductances as a function of the rotor angle γ.

This means that, if excitation is present, nonambiguous conclusions can be drawn from the rotational angle-dependent course of the winding inductance with respect to the course and the level of the torque that is generated: A positive torque is generated if the winding inductance increases in the presence of a positive change of the rotational rotor angle γ; a negative torque is generated if the inductance decreases. If there is no change, a torque generation does not take place (see FIG. 1).

Figure 2:
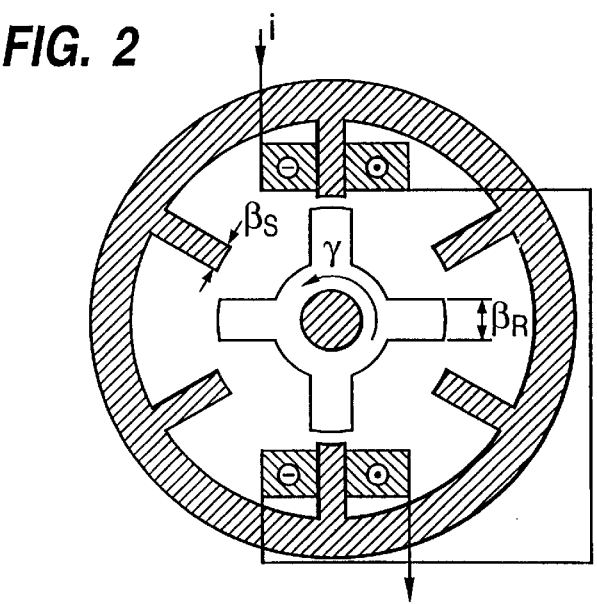
FIG. 2 the cross section of a motor addressed here.

An embodiment of such a motor is illustrated in cross section in FIG. 2.

Figure 3:
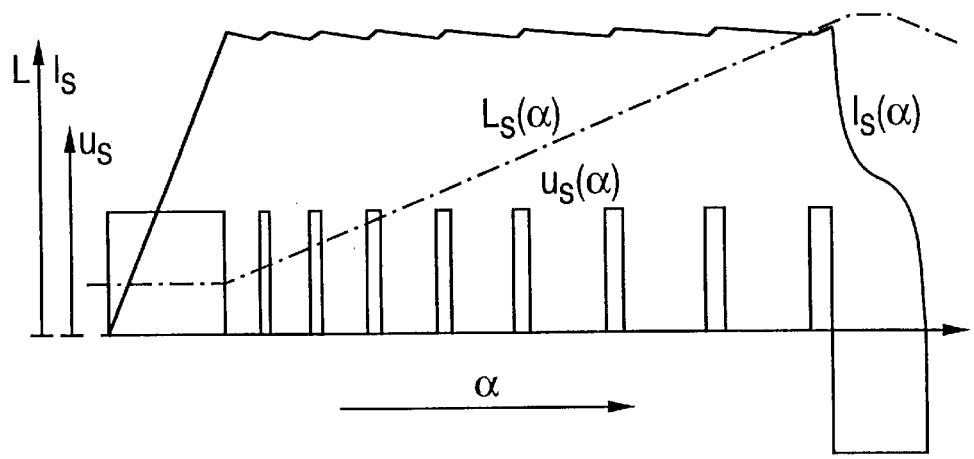
FIG. 3 current and terminal voltage in the chop range.

The speed of rotation-torque characteristic of the switched reluctance motor has two different operating ranges: The first is the so-called "chop range" (see FIG. 3). The phase winding current control takes place by means of a pulse width modulation of the motor terminal voltage. The torque is controlled by means of the level of the current and the change of the switch-on control angle and switch-off control angle.

Figure 4:
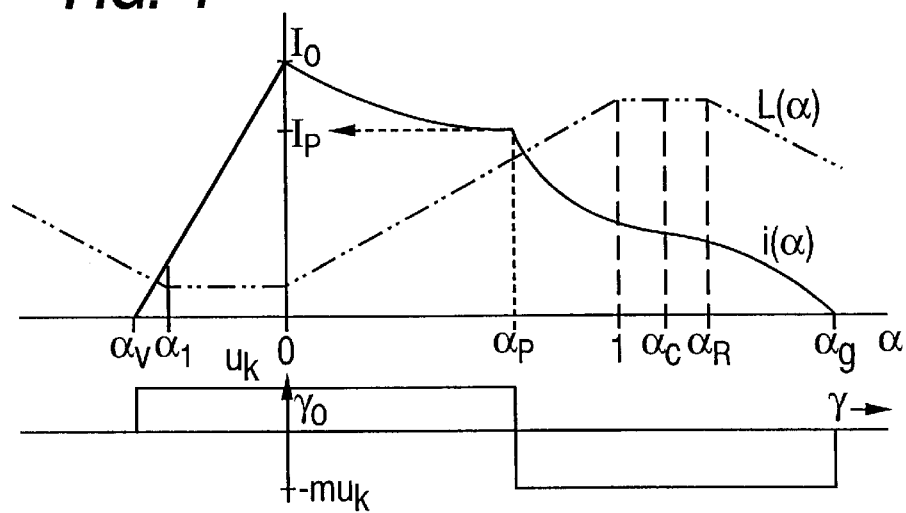
FIG. 4 current and terminal voltage in the block voltage range.

The second operating range is the block voltage range (see FIG. 4). Current as well as torque can only be controlled via changing the switch-on angle and switch-off angle.

The transition point from the chop range to the block voltage range is reached when the direct supply voltage $u_K$ of the motor output electronics is just as high as the "pseudo emf" of the motor while neglecting all ohmic losses.

At this point, the current $i_G$ is ($\beta_s$ is defined according to FIG. 2):

$$i_G = \frac{u_K \cdot \beta_S}{2\pi \cdot n_{ist} \cdot (L_{max} - L_{min})}$$

As soon as the drive speed control sets a desired current value larger than the one mentioned above, the drive operates in the block voltage range. If all ohmic losses and all magnetic couplings are neglected and if the machine is assumed to be saturation-free, the current course in the block voltage mode, such as it is schematically illustrated, for example, in FIG. 4, can be reproduced analytically. Here it is assumed that the motor terminal voltage during the switch-on and down commutation duration of the current is constant and the voltages effective during this process have a known ratio relative to the direct supply voltage:

Switch-on duration $$u_{turn-on} = +1 \cdot u_K$$

Down commutation $$u_{turn-off} = -m \cdot u_K.$$

Thus, the equation for the motor terminal voltage is simplified to $$u(\gamma) = \frac{d\gamma}{dt} \cdot \frac{d}{d\gamma} \{i \cdot L(\gamma)\} = \omega_{act} \cdot \frac{d}{d\gamma} \{i \cdot L(\gamma)\}.$$

In order to calculate the shape of the current curve, this equation must be solved in sections according to the course of the inductance and the switch state at the motor terminal. Here it is assumed that the switch-off process is started within the rising inductance slope, i. e., $\alpha_p \leq 1$, and is completed within the declining inductance slope, i.e., $\alpha_g \geq \alpha_R$.

For the further calculation procedure, all state values are normalized. Normalized phase winding current:

$$I = \frac{i_s}{i_G} = \frac{i_s \cdot \omega_{ist} \cdot (L_{max} - L_{min})}{u_K \cdot \beta_S}$$

Normalized rotational rotor angle $$\alpha = \frac{\gamma}{\beta_S}$$

If the current at $\alpha=0$ is defined as $I_O$ and if integration takes place, the analytical equation for determining the current as a function of the switch-off angle $\alpha_p$ is obtained:

$$I_p = \frac{\alpha_p + I_0 \cdot b}{b + \alpha_p} \quad ; b = L_{min}/(L_{max} - L_{min}).$$

By means of this equation, the angle $\alpha_g$ at which the switch-off process is completed can be determined:

$$\alpha_g = \frac{\alpha_p \cdot (1+m) + I_0 \cdot b}{m}.$$

From this, the duration of the switch-off process can be determined:

$$\alpha_{off} = \alpha_g - \alpha_g = \frac{\alpha_p + I_0 \cdot b}{m}.$$

It should be noted that the angle $\alpha_g$, at which the down commutation is completed, is of constant maximum inductance independently of the size of the angle range. Furthermore, solely from the knowledge of the current $I_O$ at the outset of the inductance increase and the normalized switch-off angle $\alpha_p$, the angle $\alpha_g$ of the end of the commutation can be inferred directly via the inductance ratio b.

It is the overriding object of the control of the reluctance motor to obtain the maximum torque yield if a motor current $I_O$ is predetermined. In theory, the maximum torque output for a preset current amplitude is accomplished when the current is switched on instantaneously in the beginning of the rising inductance slope and the current is switched off instantaneously at the end of the inductance rise. Because of the limited voltage reserve within the power electronics, the times for both processes cannot be neglected. At high speeds of rotation, angle ranges in the magnitude of 15° are easily exceeded for each process.

If these times for the commutation processes are not considered in the actuation of the motor, this leads to a considerable reduction of the torque output of the motor because in addition to the driving torque, a considerable braking torque component is also generated or the desired current has not yet been reached in the beginning of the inductance increase. Additionally, the waviness of the torque and consequently the noise emission of the motor are influenced. The effect of these processes is all the greater the higher the speed of rotation or the longer the duration of the up and down commutation processes relative to the electric cycle of the motor.

Figure 5:
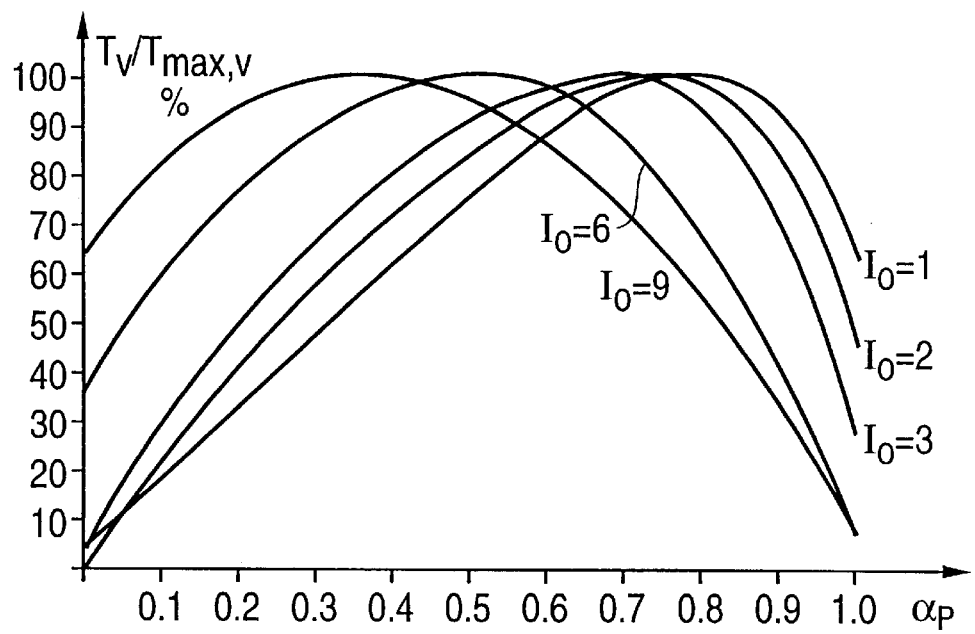
FIG. 5 the dependence of the normalized torque output on the normalized switch-off angle.

FIG. 5 illustrates the influence of the switch-off control angle on the torque output. Shown is the torque output, normalized to the maximum torque output when the current is predetermined, as a function of the normalized switch-off control angle $\alpha_p$ at different normalized currents $i_O$. It was varied between $I_O=1$ and $I_O=9$. As system parameter for the simulation, the normalized symmetry angle $\alpha_c$, which indicates the relative pole overlap of stator teeth and rotor teeth (see FIG. 4), was selected to be $$\alpha_c = \frac{\gamma_c}{\beta_S} = \frac{\beta_R + \beta_S}{2\beta_S} = 1.0935$$

and the inductance ratio b is 0.187. Saturation was neglected. FIG. 5 illustrates by way of example that, as the current amplitude $I_O$ increases, the optimum value of $\alpha_p$ decreases from $\alpha_p=0.8$ at $I_O=1$ to $\alpha_p=0.35$ at $I_O=9$. Unfavorably selected switch-off angles result in a remarkable loss at the torque. If, for example, the switch-off angle is kept constant at 0.8 and the current is increased from $I_o=1$ to $I_o=6$, the torque loss results in a torque reduction of more than 25% because the switch-off angle is maintained.

The maximum torque can be accomplished if a normalized switch-off angle $\alpha_p=1$ can be selected and the switch-off process is completed prior to the beginning of the decreasing inductance slope. The minimum current value for which this marginal condition is fulfilled is $$I_{o,min} = \frac{2m(\alpha_c - 1)}{1 + b}$$

With the known parameters of b=0.185, m=1 and $\alpha_c$=1.0935, $$I_{O,min} = 0.158.$$

Thus, it applies that, at normalized currents greater than 16%, the optimum switch-off angle must be selected to be different from $\alpha_p$.

Therefore, the question arises as to when the down commutation should be initiated or how the down commutation process should be distributed to the motor and generator torque range so that, as a consequence, a maximum torque yield results.

To better illustrate the division of the down commutation process to the motor or generator torque range, the following quotient, identified as $a_{Kom}$, is introduced for the further examinations:

$$a_{Kom} = \frac{\alpha_g - \alpha_c}{\alpha_g - \alpha_p}.$$

For example, the down commutation process for a value of $a_{Kom}=0.5$ is divided at a ratio of 1:1 between the motor and generator range.

If a constant value of the switch-off ratio of ⅔ is used for determining the optimum switch-off angle, the switch-off angle can be determined according to the following simple equation:

$$\alpha_{p,opt} = \frac{3m \cdot \alpha_c - b \cdot I_o}{3m + 1}$$

for $I_o \geq 1$ and $a_{Kom,opt} = \frac{2}{3}$

With preset drive parameters, a simple, linear relation between the switch-off angle and the current is obtained.
If b=0.185, m=1 and $\alpha_c$=1.0935, then $$\alpha_{p,opt} = 0.820 - 0.0462 \cdot I_O.$$

The only thing that needs to be known for this algorithm is the actual value of the supplied current $I_O$, the current at the beginning of the rising inductance slope. Additional current measurements are not necessary. If the current path is switched on prior to the beginning of the rising inductance slope and the current is limited during this process by means of a two-point current regulator, the current is at its predetermined value at the beginning of the rising inductance slope. Methods for determining suitable input angles are known.

For the determination of the switch-off angle it is therefore sufficient if the desired value of the phase winding current is known. This value is normalized with the actual value of the rotor speed which is known within the speed control loop and it is compared with the actual value of the direct supply voltage.

The algorithm for the chop range is similar to the algorithm for the block voltage range which was described. Differences are due to the simulation of the clocking.

In this operating range, the current regulator applies a mean voltage to the motor terminals so that the mean di/dt becomes zero and, as a result, the current is impressed. If all ohmic losses are neglected, it follows that the mean voltage has the following value:

$$u_s\left(\text{Chop}, \frac{di}{dt} = 0\right)\bigg|_{AVG} = \frac{\partial L(\gamma, i)}{\partial \gamma} \cdot \omega_{ist} \cdot i_s.$$

The comparison of this voltage m in the direct supply voltage leads to a ratio n $$n = \frac{u_K}{u_s\left(\text{Chop}, \frac{di}{dt} = 0\right)\bigg|_{AVG}}$$

If $u_K$ is replaced by $$u_K = \frac{i_G \cdot \omega_{ist} \cdot (L_{max} - L_{min})}{\beta_S},$$

the result is $$n = \frac{i_G \cdot \omega_{ist} \cdot (L_{max} - L_{min})/\beta_S}{i_s \cdot \omega_{ist} \cdot (L_{max} - L_{min})/\beta_S}$$

$$n \stackrel{!}{=} \frac{i_G}{i_s}.$$

Since in the respective equations the mean di/dt is zero, $$u_s\left(\text{Chop}, \frac{di}{dt} = 0\right)\bigg|_{AVG} = \frac{\partial L(\gamma, i)}{\partial \gamma} \cdot \omega_{ist} \cdot i_s$$

this derivation is permissible. As a consequence, the ratio n is simply the reciprocal value of the normalized current I:

$$n = 1/I.$$

Since the current is impressed, the current at the start of the switch-off process is equal to the current at the beginning of the rising inductance slope $$I_p \text{ (chop)} = I_O = I_{phase}$$

$$I_p \text{ (chop)} = 1/n.$$

Thus, the extinction angle $\alpha_g$ is obtained $$\alpha_g = \alpha_p + \frac{b + \alpha_p}{n \cdot m}.$$

If the switch-off ratio $a_{Kom}$ is introduced as in the block voltage range, the desired switch-off control angle is as follows $$\alpha_p = \frac{(a_{Kom} - 1) \cdot b + n \cdot m \cdot \alpha_c}{n \cdot m + 1 - a_{Kom}},$$

If the switch-off ratio is again fixed from ⅔ and if $n = 1/I_O$ is set, it follows for $I_O \geq I_{Omin}$ $$\alpha_{p,opt} = \frac{3m \cdot \alpha_c - b \cdot I_o}{3 \cdot m + I_o} \; ; \text{ for } I_o \leq 1.$$

If this equation is compared with the corresponding one for the block voltage range, the discontinuity-free transition at $I_O = 1$ from the chop range into the block voltage range becomes evident.

For currents smaller than $I_{Omin}$, the optimum switch-off angle is $\alpha_p = 1$.

Since this concludes the discussion of the parameters that are essential for the motor control, it is shown by way of a block diagram (FIG. 6) and a flow diagram how the insights gained are used in practice in order to operate a reluctance motor according to the invention with a torque that is as large as possible.

Figure 7:
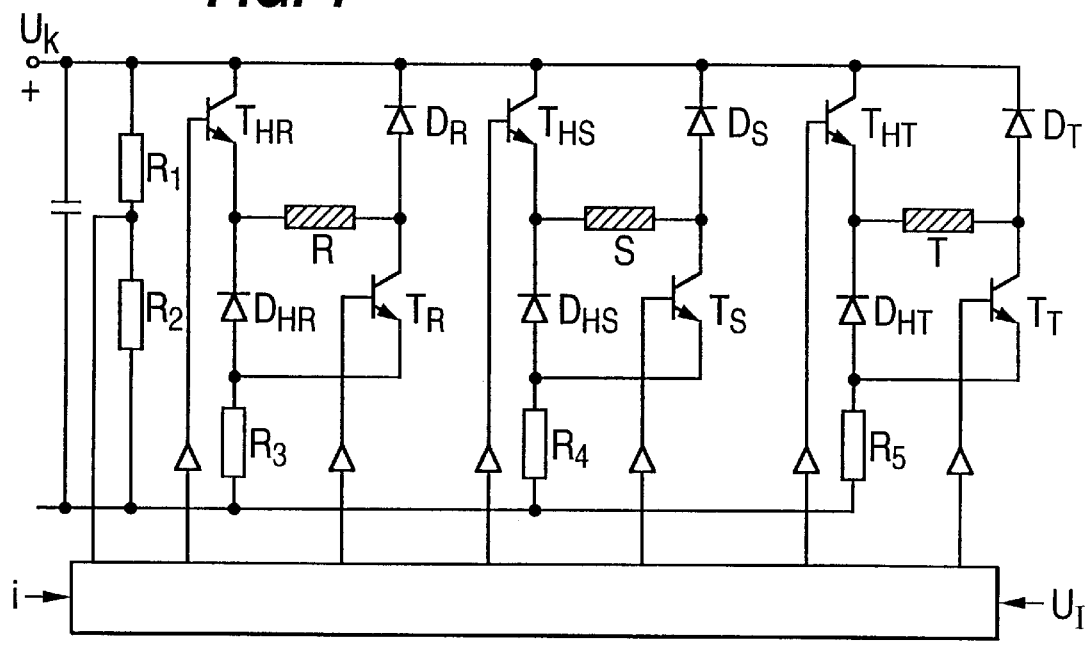
FIG. 7 the power positioning element.
Figure 6:
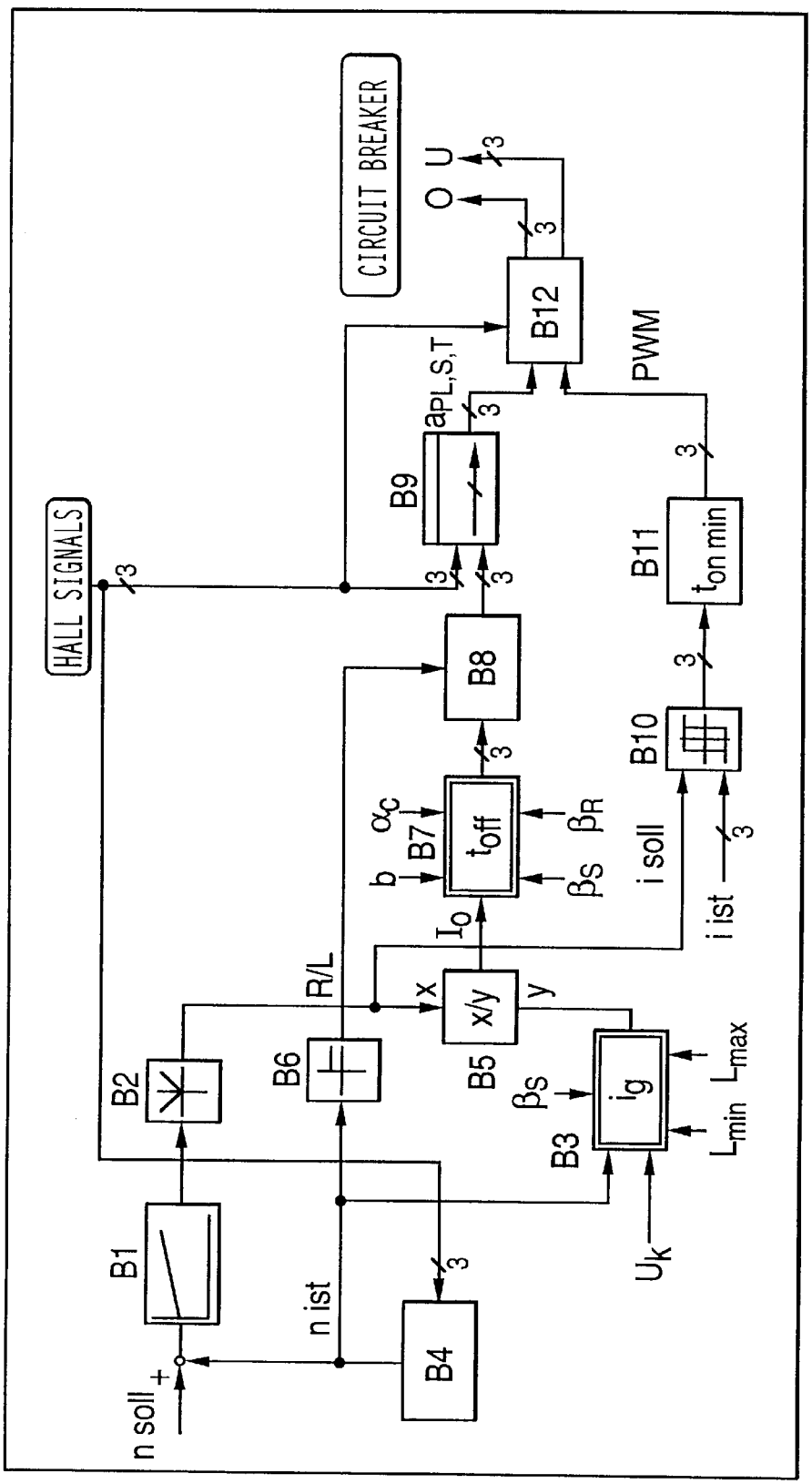
FIG. 6 the block diagram of the control system.

As an exemplary embodiment for the actuation of the reluctance motor, there first follows the description of the block diagram of FIG. 6. The block diagram comprises two systems. The one is the speed of rotation control system which determines the actual operating quantities. These are: desired current $i_{soll}$, the directional signals right-left and the actual value of the speed of rotation $n_{ist}$. The second system comprises the functional networks of the control signals. The desired value of the current is determined from the difference between the actual value and desired value of the speed of rotation $n_{ist} - n_{soll}$. This quantity is supplied to a control unit (block B1). Its output quantity is rectified in block B2. At the output of B2, the desired value of the current $i_{soll}$ is obtained. The signal of the rotating direction is obtained from the sign of the actual value of the speed of rotation. The actual speed of rotation value is obtained in B4 from the Hall signals. Thus, all operating quantities are known for the computing algorithm. The sequence of the algorithm is as follows: The limit current $i_G$ is determined from the actual value of the speed of rotation $n_{ist}$ and from the actual value of the direct supply voltage or intermediate circuit voltage $u_K$ (measured via a resistance network), from the motor parameters $L_{min}$ and $L_{max}$, which are deposited in a memory, and from the value of the stator pole angle $\beta_s$, which is also fixedly deposited. This takes place in a nonlinear functional network B3. This value is supplied to a divider B5, which determines the normalized current $I_O = i_{soll}/i_G$ from the desired value of the current $i_{soll}$ and the current $i_G$ by dividing these two quantities. This normalized current $I_O$ is supplied to a nonlinear functional network B7 which calculates the switch-off time $t_{off}$ by means of the fixedly deposited values for the stator pole angle $\beta_s$, the rotor pole angle $\beta_R$, the quantity b and the angle $\alpha_c$, which are all fixedly deposited in a memory. In the subsequent functional network B8, this time is additionally evaluated with the speed of rotation information R/L from B6 and supplied to a nonlinear time element. This time element B9 is, for example, a timer component. This element is initialized by the Hall signals of the three motor phase windings R, S, T. Following the expiration of the absolute switch-off time, which was determined in the functional network B9, the switch-off process of the current-conducting phase winding is initiated. In the next functional network B12, this signal is additionally linked with the pulse-width-modulated signals of the current regulator. This is necessary if pulse signals for the six circuit breakers (see FIG. 7) are to be generated in the chop range. These pulse-width-modulated signals are formed from the difference between the desired current and the actual current, are supplied to a two-position controller B10 and are subsequently guided via a further element B11 which provides for a minimum switch-on time $t_{on\;min}$.

Figure 8:
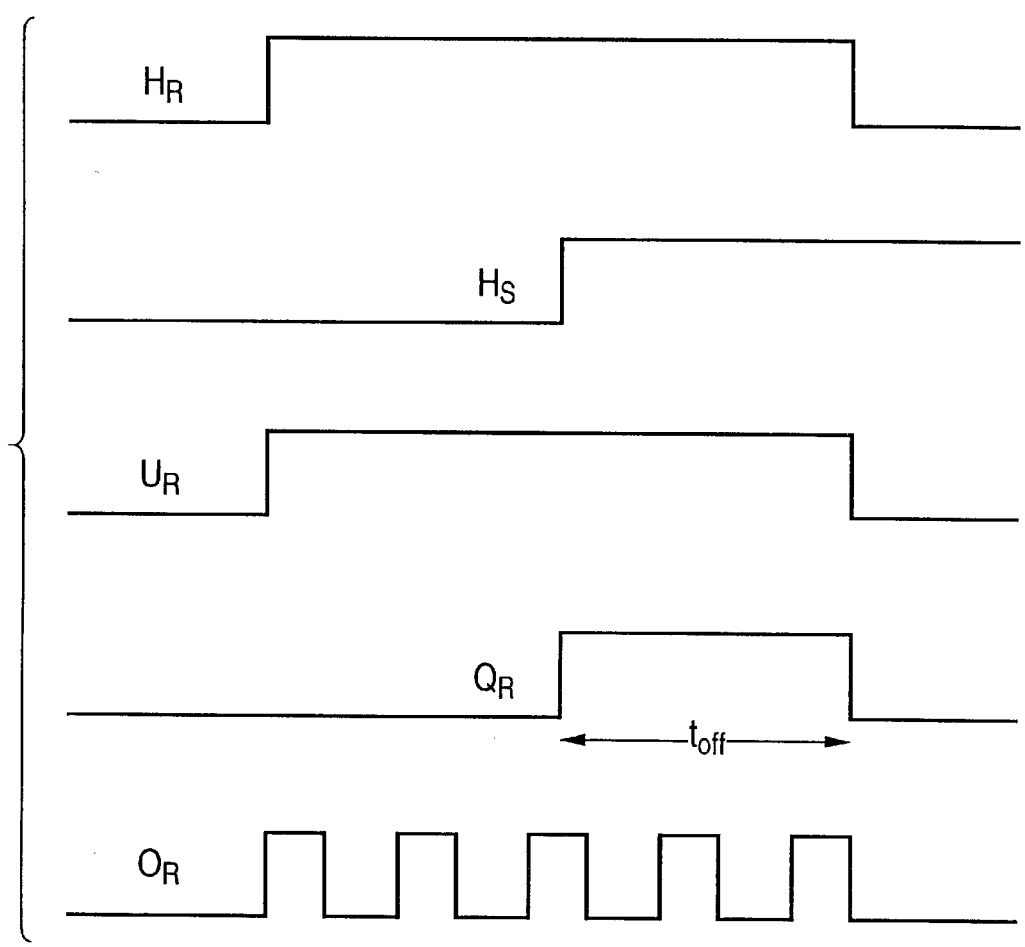
FIG. 8 the flow diagram.

The pulse diagram (FIG. 8) shows the generation of the actuation signals for the inverter. The signal $O_R$ controls the upper circuit breaker in the branch with the phase winding R and the signal $U_R$ the lower circuit breaker. The signal $H_R$ triggers the switching-on of phase winding R in that the actuation signal of $U_R$ is set to logic 1. It remains at logic 1 until the switch-off moment is reached. The associated signal is triggered in that the subsequent signal $H_s$ of the Hall probe supplies a start-up signal for phase winding S to the timer component. The timer runs until the time $t_{off}$ is reached. Once this time has expired, the decrease of the output signal triggers the resetting of the actuation signal $U_R$. The actuation signal or switch-on signal of the upper circuit breaker $O_R$ is determined, on the one hand, in that the pulse width modulation signals PWM are linked with the signal of the lower circuit breaker in B12 with a logic AND gate. In this manner, the time signal $U_R$ represents a long pulse and the subsequent signal of the upper circuit breaker $O_R$ a pulse-width-modulated signal.

What is claimed is:

1. A method for controlling a reluctance motor having a stator with phase windings and having operating ranges comprising a "chop" range and a block voltage range, the method comprising:

storing in a memory minimum and maximum inductances ($L_{min}$, $L_{max}$) of the phase winding and a value of the stator pole angle ($\beta_s$), exciting each phase winding according to a predetermined switch-on angle, calculating a switch-off angle ($\gamma_p$) for the operating ranges of the reluctance motor from an actual value of the speed of rotation ($n_{ist}$), an actual value of a supply voltage ($u_k$), the minimum and maximum inductances ($L_{min}$, $L_{max}$) of the phase winding, and the value of the stator pole angle ($\beta_s$), determining a limit current ($i_G$) from a product of the actual value of the supply voltage ($u_k$) and the value of the stator pole angle ($\beta_s$) divided by a product of the actual value of the speed of rotation ($n_{ist}$) and the difference between the maximum and minimum inductances ($L_{max}$, $L_{min}$) of a motor phase winding, supplying the limit current ($i_G$) to a divider, the divider determining a normalized current ($I_c$) from a desired value of the current ($i_{soll}$) and the limit current ($i_G$), supplying the normalized current ($I_o$) to a nonlinear functional network, the nonlinear functional network determining a switching-off time ($t_{off}$) with fixedly deposited values for the stator pole angle ($\beta_s$) values for relative pole overlap of stator teeth and rotor teeth ($\alpha_c$) the rotor angle ($\beta_R$), and the minimum and maximum inductances ($L_{min}$, $L_{max}$), evaluating the switching-off time ($t_{off}$) in a subsequent functional network with speed of rotation information (R/L), supplying the output of the subsequent functional network to a nonlinear time element for triggering a switching-off process at the stator phase windings, and switching off each phase winding according to the switch-off angle ($\gamma_p$) having an angular count starting with an inductance rise of the excited phase winding.

2. A method according to claim 1, further comprising:

measuring angular position of the rotor relative to the stator using an angle sensor, and triggering and supplying an initialization pulse to a controller having an arithmetical unit, the controller first determining a switch-off angle ($\alpha_p$) at which the switching-off process begins from the stator pole angle $\beta_s$, and then determining an angle ($\alpha_g$) at which the switching-off process must be completed, thereby determining a moment for the switching-off process of the phase winding.

3. A method according to claim 1, wherein the speed of rotation is controlled via current intensity in the stator phase windings.

4. A method according to claim 1, wherein the switching-off process is triggered when approximately ⅔ of a total time has passed after a symmetrical overlap of stator teeth and rotor teeth.

5. A method according to claim 1, wherein after the actual value of the speed or rotation ($n_{ist}$) is measured, the desired value of the current ($i_{soll}$) is determined and subsequently the speed of rotation is controlled to a desired value of the speed of rotation ($n_{soll}$) using a phase winding current ($i_s$) calculated from the desired value of the current ($i_{soll}$).

* * * * *